US011372662B2

(12) United States Patent
Khare (10) Patent No.: US 11,372,662 B2
(45) Date of Patent: *Jun. 28, 2022

(54) AGENT-BASED THROTTLING OF COMMAND EXECUTIONS

(71) Applicant: Rapid7, Inc., Boston, MA (US)

(72) Inventor: Shreyas Khare, Toronto (CA)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/342,669

(22) Filed: Jun. 9, 2021

(65) Prior Publication Data

US 2021/0365283 A1    Nov. 25, 2021

Related U.S. Application Data

(63) Continuation of application No. 16/881,103, filed on May 22, 2020, now Pat. No. 11,061,702.

(51) Int. Cl.
| | |
|---|---|
| *G06F 9/455* | (2018.01) |
| *H04L 12/923* | (2013.01) |
| *G06F 9/38* | (2018.01) |
| *H04L 29/06* | (2006.01) |
| *G06F 9/30* | (2018.01) |
| *H04L 47/762* | (2022.01) |
| *H04L 9/40* | (2022.01) |

(52) U.S. Cl.
CPC ........ *G06F 9/45512* (2013.01); *G06F 9/3009* (2013.01); *G06F 9/3836* (2013.01); *H04L 47/762* (2013.01); *H04L 63/1475* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,687,838 B2 | 2/2004 | Orenstien et al. | |
| 7,159,133 B2 | 1/2007 | Orenstien et al. | |
| 7,171,482 B2 | 1/2007 | Jones, Jr. et al. | |
| 7,779,237 B2 | 8/2010 | Correale, Jr. et al. | |
| 7,937,568 B2 | 5/2011 | Correale, Jr. et al. | |
| 11,061,702 B1* | 7/2021 | Khare | H04L 63/1475 |
| 2009/0019265 A1* | 1/2009 | Correale, Jr. | G06F 1/3246 |
| | | | 712/216 |
| 2013/0111191 A1 | 5/2013 | Murray et al. | |

(Continued)

*Primary Examiner* — Umut Onat
(74) *Attorney, Agent, or Firm* — Ashwin Anand (57) ABSTRACT

Disclosed herein are methods, systems, and processes to perform granular and selective agent-based throttling of command executions. A resource consumption threshold is allocated to an agent process that is configured to perform data collection tasks on a host computing device. A desired throttle is generated for the agent process based on the resource consumption threshold allocated to the agent process and execution of the agent process is controlled in polling intervals. For each polling interval, a current throttle level for the agent process is determined based on a run count and a skip count of the agent process, the agent process is suspended if the agent process is active and the current throttle is greater than the desired throttle level, and the agent process is resumed if the agent process is idle and the current throttle level is not greater than the desired throttle level.

20 Claims, 5 Drawing Sheets

(56) References Cited

U.S. PATENT DOCUMENTS

2015/0023160 A1\* 1/2015 Alisawi .................. H04L 67/28
370/230
2020/0371575 A1 11/2020 Garcia-Tobin et al.

\* cited by examiner

Command Execution Throttling Engine
115

```
run_count = 1  # Intervals process has spent actively running
skip_count = 0 # Intervals process has been idle
running = True # Current state of process
while thread is alive:
  for every polling_interval:
    current_throttle = run_count / (run_count + skip_count) * 100
    if running and current_throttle > desired_throttle:
      1. suspend process and children
      running = False
    else if not running and current_throttle <= desired_throttle:
      2. resume process and children
      running = True
    if running: run_count += 1
    else: skip_count += 1
```

AGENT-BASED THROTTLING OF COMMAND EXECUTIONS

CROSS-REFERENCE TO RELATED APPLICATIONS

The present application claims the benefit (and is a continuation) of pending U.S. patent application Ser. No. 16/881,103 titled "Agent-Based Throttling of Command Executions" and filed on May 22, 2020, now issued as U.S. Pat. No. 11,061,702 B1 on Jul. 31, 2021, the disclosure of which is incorporated by reference as if set forth in its entirety herein.

BACKGROUND

Field of the Disclosure

This disclosure is related is to data collection and analysis (DCA) in cybersecurity computing environments, and in particular, to agent-based throttling of command executions.

Description of the Related Art

Modern cybersecurity solutions collect vast amounts of data from host computing devices (e.g., a protected host) regarding users, running processes, executing applications, network connections, and the like, to determine whether the protected host is vulnerable to malicious actions and/or attacks. In a typical implementation, an agent is installed on the protected host to perform real-time data collection and analysis (DCA).

An agent is lightweight software that can be installed on various supported assets in the cloud or on-premises to centralize and monitor data. The agent provides endpoint visibility and detection by collecting live system information (e.g., basic asset identification information, running processes, and logs) from assets and sends this data back to a centralized platform (e.g., a centralized cybersecurity cloud platform) for analysis.

The aforementioned data collection routine requires running commands on the protected host (e.g., command executions). Such command executions can include commands for identifying a file on a file system of the protected host, running task automation and configuration management commands to extract group policy information, running a command-line utility to search plain-text data sets for lines that match a regular expression, calculating hash function checksums, reading files (e.g., using concatenate commands), and the like.

Unfortunately, in certain scenarios, command execution by an agent installed on a protected host results in significant processing power consumption on the protected host and is prohibitive for a user of the protected host.

SUMMARY OF THE DISCLOSURE

Disclosed herein are methods, systems, and process to perform agnostic granular agent-based throttling of specific command executions. One such method involves monitoring a polling interval of an agent process executing on a host computing device, and for the polling interval: (a) suspending the agent process and one or more children of the agent process and incrementing a run count of the agent process if the agent process is running and a current throttle is greater than a desired throttle, or (b) resuming the agent process and the one or more children of the agent process and incrementing a skip count of the agent process if the agent process is not running and the current throttle is less than or equal to the desired throttle.

In one embodiment, the method involves determining that a command execution thread is active. In this example, the command execution thread is executed and monitored by an abstraction layer provided by the agent process and the agent process is initiated by an agent executing on the host computing device.

In another embodiment, the method involves determining that a command execution associated with the agent process has exceeded or is likely to exceed a resource consumption threshold based on identifying that the command execution is at least one of a full filesystem search or a lengthy PowerShell script that is part of a data collection routine performed by an agent executing on the host computing device.

In certain embodiments, the polling interval is a frequency with which the agent process is monitored, the desired throttle indicates an efficiency value at which the agent process should run based on the resource consumption threshold allocated to the agent process, the current throttle is based on at least the run count and the skip count of the agent process in the polling interval, the run count indicates a number of polling intervals the agent process has spent actively running, and the skip count indicates a number of polling intervals the agent process has been idle.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

While the disclosure is susceptible to various modifications and alternative forms, specific embodiments of the disclosure are provided as examples in the drawings and detailed description. The drawings and detailed description are not intended to limit the disclosure to the particular form disclosed. The intention is to cover all modifications, equivalents and alternatives falling within the spirit and scope of the disclosure as defined by the appended claims.

DETAILED DESCRIPTION

Introduction

In modern cybersecurity computing environments, data collection and analysis (DCA) is of paramount importance to determine whether a protected host computing device (hereinafter 'protected host(s)') is vulnerable to a malicious attack. Therefore, cybersecurity solutions (e.g., vulnerability management (VM) systems, security information and event management (SIEM) systems, and the like, require the collection of vast amounts of data from protected hosts regarding user data, active running processes, system configurations, currently executing applications, network connections (e.g., requests and responses), and the like.

As noted, in a typical implementation, a lightweight piece of software called an agent is downloaded and/or installed on a protected host (e.g., regardless of whether the protected host is deployed on 'the cloud' or 'on-premises') to perform real-time DCA. As part of a data collection routine, the agent frequently collects live system information such as basic asset identification data, running processes, and log data (the collection part of DCA), and transmits this data back to a centralized cybersecurity cloud platform for analysis (the analysis part of DCA).

The aforementioned data collection routine requires command executions on the protected host to perform several DCA-related tasks and/or operations associated with the protected host's file system and/or operating system (OS). Examples of command executions include, but are not limited to, commands for identifying a file on a file system (e.g., using GNU (GNU's Not Unix® !) (hereinafter simply Unix) find on Linux® (hereinafter simply Linux) or BSD (Berkeley Software Distribution) find on OS X® (previously macOS®))(hereinafter simply OS X and macOS), running task automation and configuration management commands (e.g., PowerShell® (hereinafter simply PowerShell) commands on Windows®) to extract group policy information, running a command-line utility to search plain-text data sets for lines that match a regular expression (e.g., grep (globally search for a regular expression and print matching lines)), calculating hash function checksums (e.g., Message Digest 5 (MD5) checksums), and reading files (e.g., using cat).

In certain scenarios, such commands can be trivial and execute fairly quickly. On certain computing devices, there may be little to no impact from the faster commands on central processing unit (CPU) utilization and subsequently, the user experience on the protected host. Unfortunately, in certain other scenarios, command execution by an agent installed on a protected host (e.g., depending on type of command and depending on the type of protected host) results in wasteful and redundant CPU consumption on the protected host and is prohibitive for a user of the protected host. What's more, existing command throttling mechanisms (which require implementation of a native command into agent source code to permit injection of generic throttling operations such as sleeps), are ineffective and are not readily portable for different commands or across different operating systems.

For example, in the case of a directory search operation in a file system, existing throttling implementations instruct a process that executes commands to sleep for a given amount of time (e.g., 0.5 seconds) after searching through a given number of directories (e.g., 10 directories). This methodology is not reliable in situations where the directory structure is unknown or is inconsistent (e.g., a directory structure of a file system with 10 directories with 20,000 files followed by 10 empty directories). In addition, the system configuration of different computing devices (e.g., CPU, memory, OS, and the like) can also result in enormous and unpredictable variations in CPU consumption for the same command.

Disclosed herein are methods, systems, and processes that facilitate and provide an improved and optimized approach for granular agent-based command execution throttling that involves managing the execution of a binary by controlling the binary externally and suspending and resuming an agent process periodically.

Example Host Computing Device with Command Execution Throttling Agent

Figure 1:
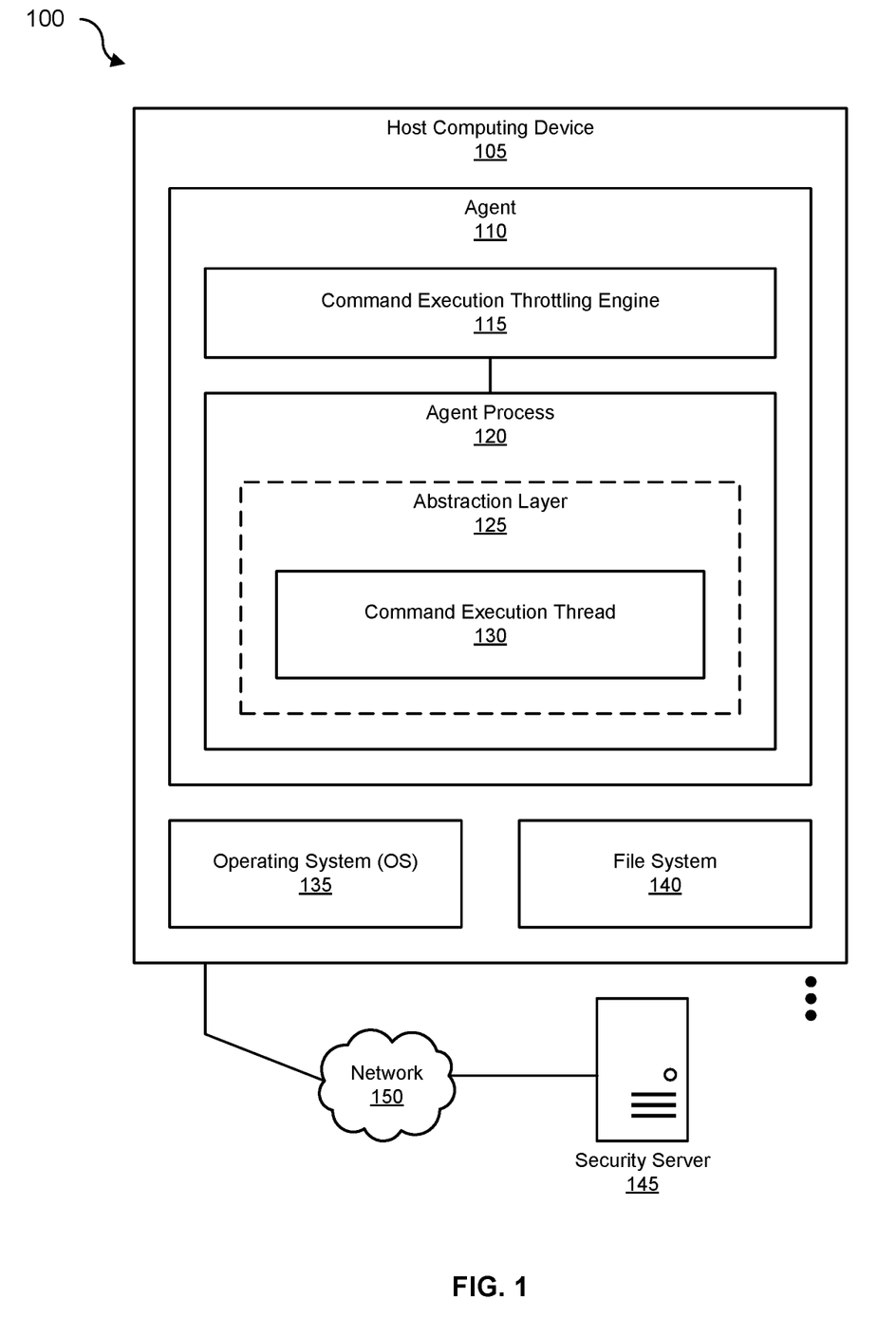
FIG. 1 is a block diagram 100 of a host computing device with an installed agent, according to one embodiment of the present disclosure.

FIG. 1 is a block diagram 100 of a host computing device 105 with an installed agent 110, according to one embodiment. Host computing device 105 can be any type of physical or virtual computing device and can be implemented in the cloud or on-premises. Host computing device 105 includes agent 110. Agent 110 periodically collects live system information from host computing device 105 (e.g., identification data, process data, log data, and the like) and transmits this data back to security server 145 or to a centralized cybersecurity cloud platform (not shown in FIG. 1) for analysis. Host computing device 105 includes at least one or more storage devices (internal and/or external), one or more processors, a memory, an operating system (OS) 135, and a file system 140. Host computing device 105 is communicatively coupled to security server 145 via network 150 (which can be any type of network or interconnection).

As shown in FIG. 1, agent 110 includes a command execution throttling engine 115. Command execution throttling engine 115 is configured by agent 110 to selectively throttle one or more agent processes that perform command executions on host computing device 105 (e.g., associated with OS 135 and/or file system 140). Agent 110 also includes an agent process 120 (e.g., a process that performs command executions). Agent process 120 provides an abstraction layer 125 which separately executes a command execution thread 130.

In one embodiment, agent 110 provides abstraction layer 125 for running a system command from agent process 120. Abstraction layer 125 provides functionality including, but not limited to, redirecting standard output (stdout)/standard error (stderr), terminating agent process 120 after a timeout or shutdown of agent 110, setting priority of agent process 120 and managing throttling regardless of the underlying OS (OS agnostic). Abstraction layer 125 executes the system level command in a separate thread (e.g., command execution thread 130) and monitors command execution thread 130 periodically (and thus provides OS and command agnosticism).

In some embodiments, command execution throttling engine 115 determines whether agent 110 is executing agent process 120 that involves a full file system search of file system 140 or a lengthy PowerShell script (e.g., based on a threshold). In this example, command execution engine 115 throttles command execution to permit agent process 120 to execute using lesser processing power, but for a longer period of time (e.g., compared to other agent process commands that do not consume as much processing power).

In other embodiments, command execution throttling engine 115 manages the execution of a binary (e.g., agent process 120) by controlling agent process 120 externally by suspending and resuming agent process 120 periodically. For example, on a Unix computing system, while agent process 120 is running, command execution throttling engine 115 sends a SIGSTOP command to the OS of the Unix computing system, which causes the OS to suspend execution of agent process 120. Eventually, command execution throttling engine 115 sends a SIGCONT command to the OS of the Unix computing system, causing the OS to resume execution of agent process 120. On a Windows® computing system, command execution throttling engine 115 uses 'process suspend' and 'process resume' application programming interface (API) calls to achieve the same result.

In certain embodiments, performing selective periodic throttling in a controlled manner (as described above) provides (and results in) granular control over CPU consumption of a protected host as well as improved user experience for a user of the protected host. For example, agent process 120 receives signals (or instructions) from command execution throttling engine 115 so suspend and resume (e.g., SIGSTOP/SIGCONT) to throttle system-wide file searches, thus providing granular control over CPU consumption (e.g., in a selective manner for a given command and for a given computing device).

Example Command Execution Throttling Engine

Figure 2:
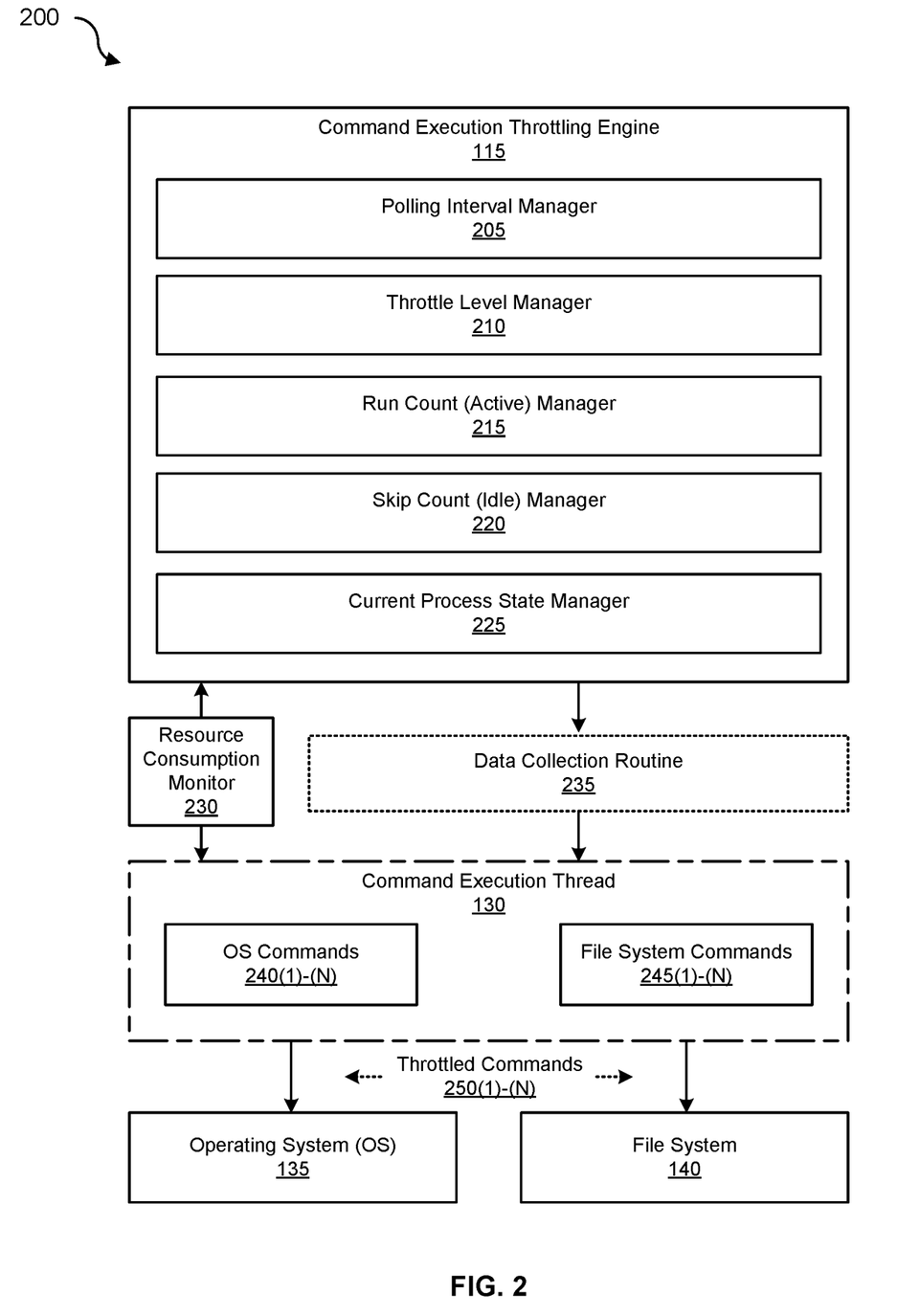
FIG. 2 is a block diagram 200 of a command execution throttling engine, according to one embodiment of the present disclosure.

FIG. 2 is a block diagram 200 of a command execution throttling engine, according to one embodiment. Command execution throttling engine 115 is part of agent 110 and performs specific granular throttling of command executions performed by command execution thread 130 of agent process 120. Command execution throttling engine 115 includes at least a polling interval manager 205, a throttle level manager 210, a run count (active) manager 215, a skip count (idle) manager 220, and a current process state manager 225.

As shown in FIG. 2, the command execution throttling system implemented to execute on host computing device 105 includes a resource consumption monitor 230 (not shown in FIG. 1). Resource consumption monitor 230, which is communicatively coupled to one or more processors of host computing device 105, determines whether an agent process (e.g., agent process 120(1)) executed by agent 110 is going to cause or is likely to cause an increase in CPU power consumption on host computing device 105 (e.g., compared to a threshold established and provided by throttle level manager 210). The determination of whether a given agent process is going to cause or is likely to cause an increase in processing resource consumption can be based on at least the agent process that is execution (or scheduled to be executed) and the system configuration of host computing device 105 (e.g., based on the type of OS, file system, memory availability, and other physical configuration-based attributes of host computing device 105). For example, if the agent process involves a full file system search of file system 140, if the agent process involves a lengthy PowerShell script associated with OS 135, or if host computing device 105 is running OS X, resource consumption monitor 230 can determine that the agent process should be designated for throttling evaluation by command execution throttling engine 115.

In one embodiment, polling interval manager 205 generates a frequency with which agent 110 monitors (running) agent process 120 (e.g., every 5 minutes, 10 minutes, half hour, an hour, day, month, and the like). The frequency of monitoring agent process 120 by polling interval manager 205 can be pre-configured (e.g., a fixed time-based interval as noted above) or can be modified in real-time based on one or more characteristics of the agent process or the protected host that may necessitate more (or less) frequent monitoring (e.g., a file system with an irregular directory structure, a host computing device running OS X, processing-heavy file system searches, lengthy and time-consuming PowerShell scripts, and the like).

In another embodiment, throttle level manager 210 generates a throttle percent (throttle_percent) that represents a desired throttle level (e.g., a number between 1 and 100). For example, a desired throttle level of 1 indicates that agent process 120 should only run at 1% efficiency (where it will take agent process 120 100× longer to finish command execution) and a desired throttle level of 100 indicates that agent process 120 is not throttled at all (and will consume as much processor resources as OS 135 allocates).

In some embodiments, run count manager 215 generates a number of intervals agent process 120 has spent actively running or executing (e.g., run_count=1 or active for one polling interval). Run count manager 215 increments run_count based on the number of intervals agent process 120 has spent actively running. In other embodiments, skip count manager 220 generates a number of intervals agent process 120 has been idle (e.g., skip_count=0 or idle for zero polling intervals). Skip count manager 220 increments skip_count based on the number of intervals agent process has been idle. Therefore, skip count manager 220 and run count manager 215 each implement a flag (skip_count and run_count, respectively) that can incremented based on the running status of agent process 120. Finally, in certain embodiments, current process state manager 225 maintains the aforementioned running status of agent process 120 (e.g., a current running status, indicated as running=True or running=False).

In one embodiment, as part of data collection routine 235, command execution throttling engine 115 throttles one or more OS commands 240(1)-(N) and/or one or more file system commands 245(1)-(N) (e.g., throttled commands 250(1)-(N) as shown in FIG. 2) that are executed as part of agent process 120. In this example, command execution throttling engine 115 monitors one or more polling intervals of agent process 120 executing on host comping device 105, and for each polling interval: (a) suspends agent process 120 and one or more children (processes) of agent process 120 and increments run_count of agent process 120 if agent process 120 is running and a current throttle (e.g., an agent process active percent indicated as process_active_percent) is greater than a desired throttle (e.g., desired_throttle provided by throttle level manager 210) or (b) resumes agent process 120 and the one or more children (processes) of agent process 120 and increments skip_count of agent process 120 if agent process 120 is not running and the current throttle (e.g., process_active_percent) is less than or equal to the desired throttle (e.g., desired_throttle).

Example Process for Agent-Based Throttling of Command Executions

Figure 3:
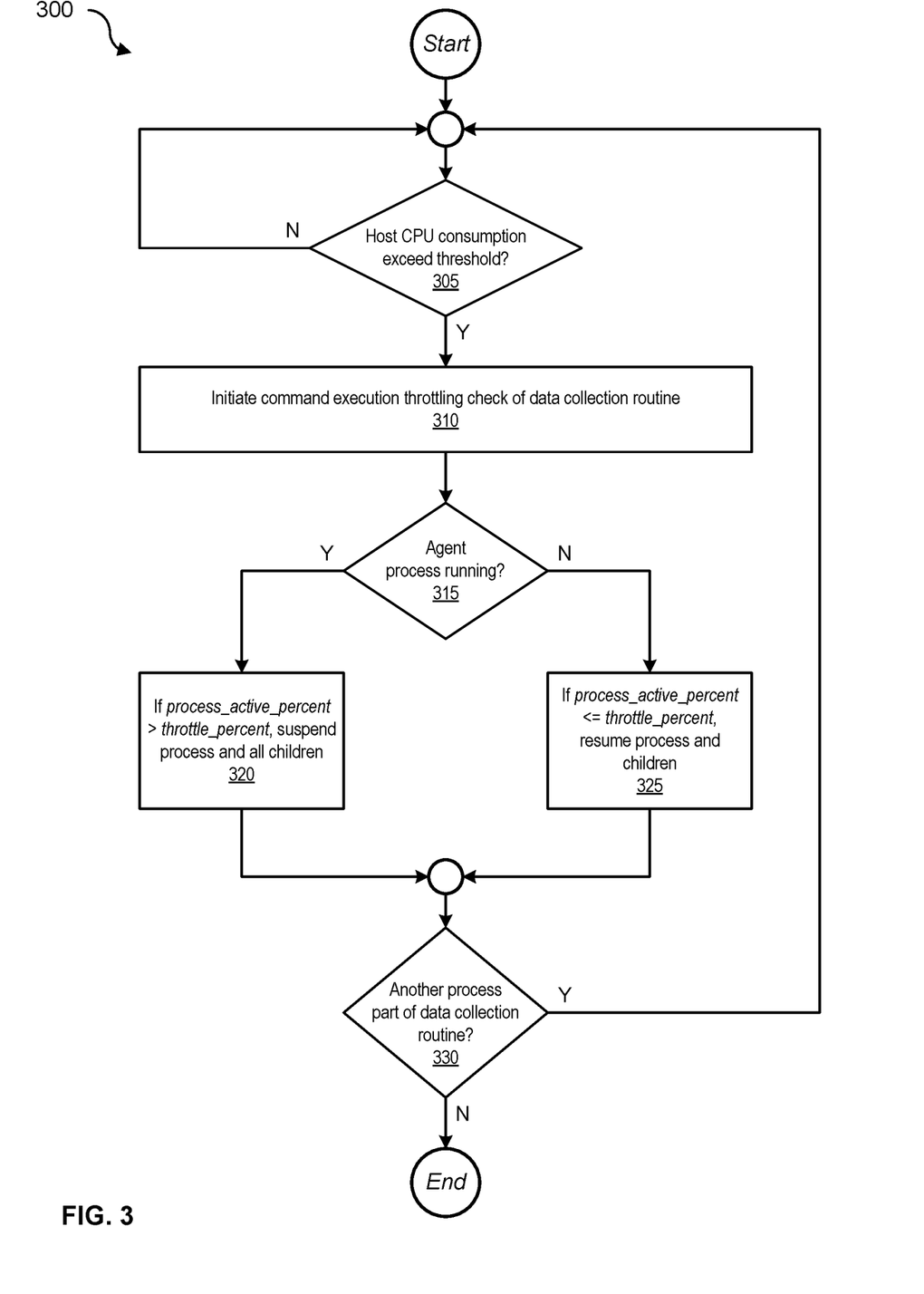
FIG. 3 is a flowchart 300 of a process to perform agent-based command execution throttling, according to one embodiment of the present disclosure.

FIG. 3 is a flowchart 300 of a process to perform agent-based command execution throttling, according to one embodiment. The process begins at 305 by determining whether host CPU consumption exceeds (a) threshold. For example, resource consumption monitor 230 shown in FIG. 2, determines whether a currently executing agent process (e.g., agent process 120(1)) is causing (or is likely to cause) CPU consumption of host computing device 105 to exceed the threshold (e.g., due to a full file system search or a length PowerShell script). The process loops to 305 until CPU consumption of the protected host exceeds or is likely to exceed the threshold.

If the CPU consumption exceeds the threshold, the process, at 310, initiates (a) command execution throttling check of data collection routine 235 (e.g., by initiating analysis of agent process 120 and the process-based and device-based characteristics of agent process 120 by command execution throttling engine 115 as shown in FIG. 2). At 315, the process determines whether agent process 120 is running (e.g., whether agent process is currently active using information provided by current process state manager 225).

If agent process 120 is running and is active, and if process_active_percent (e.g., current_throttle) is greater than throttle_percent (e.g., desired_throttle), the process, at 320, suspends agent process 120 and all children processes of agent process 120. However, if agent process 120 is not running (is inactive), and if process_active_percent (e.g., current_throttle) is less than or equal to throttle_percent (e.g., desired_throttle), the process, at 325, resumes agent process 120 and all children processes of agent process 120.

In certain embodiments of foregoing processes of FIG. 3, process_active_percent (e.g., current_throttle) is based on run_count and skip_count (e.g., current_throttle=run_count/(run_count+skip_count)×100). As noted, throttle_percent is a desired throttling level (e.g., desired_throttle is between 1 and 100) and is based on the efficiency expected based on the given agent process (e.g., a full file system search) and/or the given system configuration of the protected host (e.g., whether the protected host is running OS X).

In some embodiments, if agent process 120 is running and active, run count manager 215 increments run_count and if agent process 120 is not running and is inactive, skip count manager 220 increments skip_count. The process of FIG. 3 ends at 330 by determining whether there is another (agent) process that is part of data collection routine 235. If there is another agent process that is part of data collection routine 235 (e.g., agent process 120(2)), the process loops to 305. Otherwise, the process ends.

Example Pseudo Code for Implementing Command Execution Throttling Engine

Figure 4:
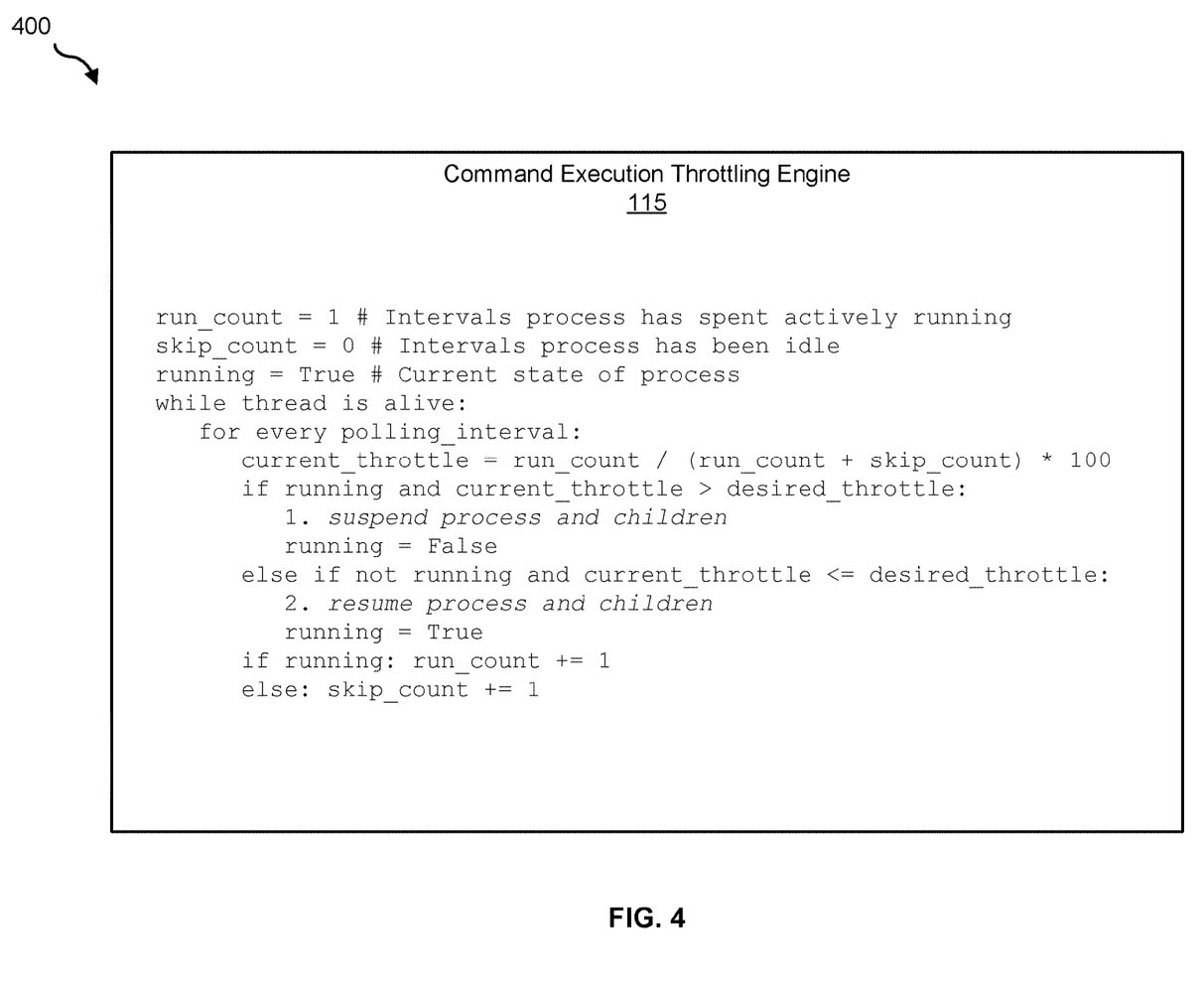
FIG. 4 is pseudo code 400 associated with a command execution throttling engine, according to one embodiment of the present disclosure.

FIG. 4 is pseudo code 400 associated with a command execution throttling engine, according to one embodiment. Agent 110 monitors a polling interval of agent process 120 executing on host computing device 105 (e.g., a protected host). While command execution thread 130 provided by abstraction layer 125 of agent process 120 is alive, and for every polling interval, command execution throttling engine 115 determines a current_throttle value. As noted, the current_throttle value is based on the run_count value and the skip_count value (e.g., current_throttle=run_count/(run_count+skip_count)×100, as shown in FIG. 4).

Therefore, while command execution thread 130 is active, for every polling interval, command execution throttling engine 115: (1) suspends agent process 120 and all children of agent process 120 if agent process 120 is running and current_throttle is greater than desired_throttle and designates running=False or (2) resumes agent process 120 and all children of agent process 120 if agent process 120 is not running and current_throttle is less than or equal to desired_throttle and designates running=True. Finally, as shown in FIG. 4, command execution throttling engine 115 increments run_count (e.g., run_count+=1) if agent process 120 is running and increments skip_count (e.g., skip_count+=1) if agent process 120 is not running.

Example Computing and Networking Environment

Figure 5:
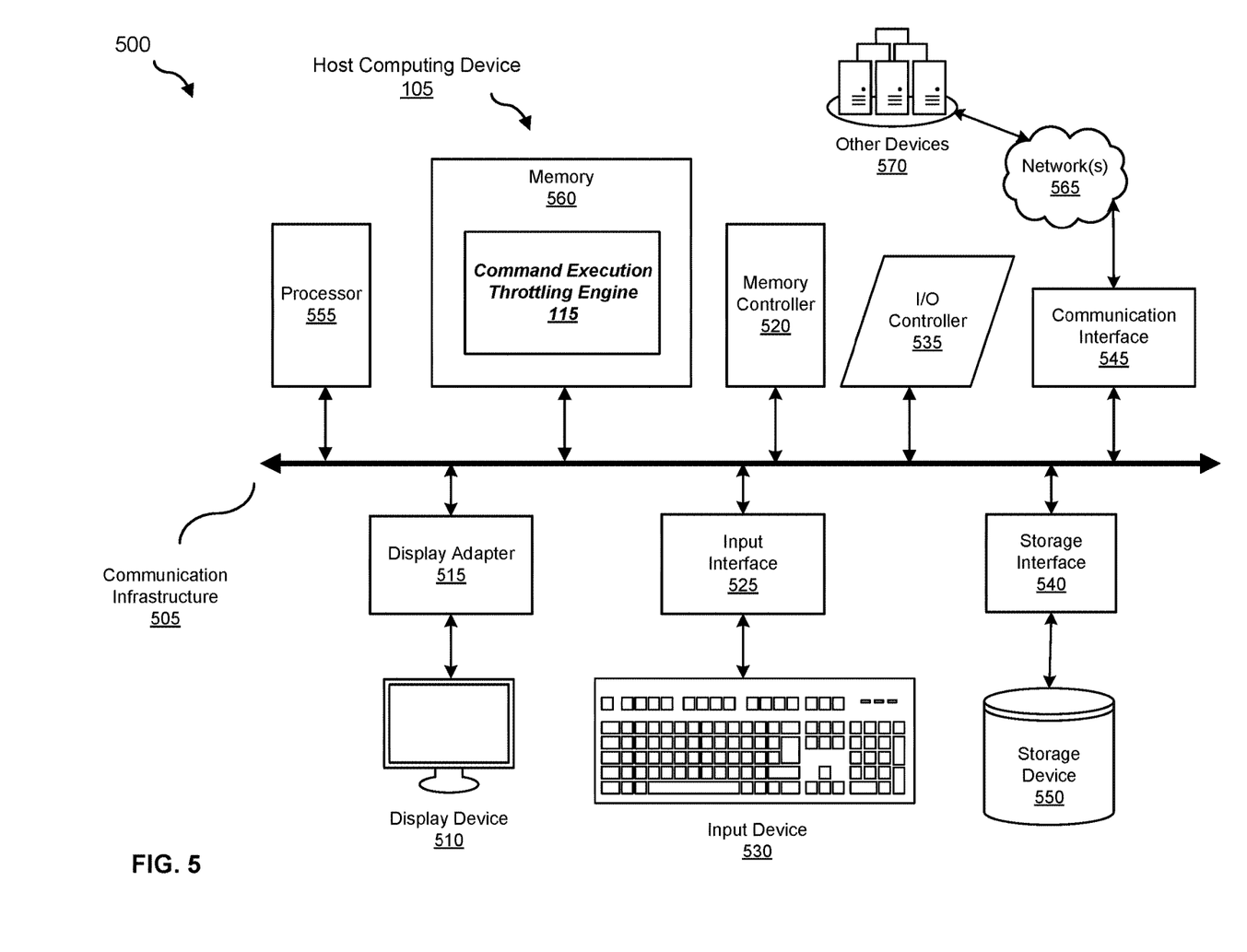
FIG. 5 is a block diagram 500 of a computing and networking system, illustrating how a command execution throttling engine can be implemented in software, according to one embodiment of the present disclosure.

FIG. 5 is a block diagram 500 of a computing and networking system and environment, illustrating how a command execution throttling engine can be implemented in software, according to one embodiment. Computing system 500 can include host computing device 105 and broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 555 and a memory 560. By executing the software that executes command execution throttling engine 115 and/or agent 110, computing system 500 becomes a special purpose computing device that is configured to perform granular and OS and command agnostic agent-based throttling of command executions.

Processor 555 generally represents any type or form of processing unit capable of processing data or interpreting and executing instructions. In certain embodiments, processor 555 may receive instructions from a software application or module. These instructions may cause processor 555 to perform the functions of one or more of the embodiments described and/or illustrated herein. For example, processor 555 may perform and/or be a means for performing all or some of the operations described herein. Processor 555 may also perform and/or be a means for performing any other operations, methods, or processes described and/or illustrated herein.

Memory 560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 500 may include both a volatile memory unit and a non-volatile storage device. In one example, program instructions implementing command execution throttling engine 115 and/or agent 110 may be loaded into memory 560.

In certain embodiments, computing system 500 may also include one or more components or elements in addition to processor 555 and/or memory 560. For example, as illustrated in FIG. 5, computing system 500 may include a memory controller 520, an Input/Output (I/O) controller 535, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type/form of device capable of handling memory or data or controlling communication between one or more components of computing system 500. In certain embodiments memory controller 520 may control communication between processor 555, memory 560, and I/O controller 535 via communication infrastructure 505. In certain embodiments, memory controller 520 may perform and/or be a means for performing, either alone or in combination with other elements, one or more of the operations or features described and/or illustrated herein. I/O controller 535 generally represents any type or form of module capable of coordinating and/or controlling the input and output functions of a computing device. For example, in certain embodiments I/O controller 535 may control or facilitate transfer of data between one or more elements of computing system 500, such as processor 555, memory 560, communication interface 545, display adapter 515, input interface 525, and storage interface 540.

Communication interface 545 broadly represents any type/form of communication device/adapter capable of facilitating communication between computing system 500 and other devices and may facilitate communication between computing system 500 and a private or public network. Examples of communication interface 545 include, a wired network interface (e.g., network interface card), a wireless network interface (e.g., a wireless network interface card), a modem, and any other suitable interface. Communication interface 545 may provide a direct connection to a remote server via a direct link to a network, such as the Internet, and may also indirectly provide such a connection through, for example, a local area network. Communication interface 545 may also represent a host adapter configured to facilitate communication between computing system 500 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 500 may also include at least one display device 510 coupled to communication infrastructure 505 via a display adapter 515 that generally represents any type or form of device capable of visually displaying information forwarded by display adapter 515. Display adapter 515 generally represents any type or form of device configured to forward graphics, text, and other data from communication infrastructure 505 (or from a frame buffer, as known in the art) for display on display device 510. Computing system 500 may also include at least one input device 530 coupled to communication infrastructure 505 via an input interface 525. Input device 530 generally represents any type or form of input device capable of providing input, either computer or human generated, to computing system 500. Examples of input device 530 include a keyboard, a pointing device, a speech recognition device, or any other input device.

Computing system 500 may also include storage device 550 coupled to communication infrastructure 505 via a storage interface 540. Storage device 550 generally represents any type or form of storage devices or mediums capable of storing data and/or other computer-readable instructions. For example, storage device 550 may include a magnetic disk drive (e.g., a so-called hard drive), a floppy disk drive, a magnetic tape drive, an optical disk drive, a flash drive, or the like. Storage interface 540 generally represents any type or form of interface or device for transmitting data between storage device 550, and other components of computing system 500. Storage device 550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 550 may also include other similar structures or devices for allowing computer software, data, or other computer-readable instructions to be loaded into computing system 500. For example, storage device 550 may be configured to read and write software, data, or other computer-readable information. Storage device 550 may also be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5. Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 560, and/or various portions of storage device 550. When executed by processor 555, a computer program loaded into computing system 500 may cause processor 555 to perform and/or be a means for performing the functions of one or more of the embodiments described/illustrated herein. Alternatively, one or more of the embodiments described and/or illustrated herein may be implemented in firmware and/or hardware.

FIG. 5 also illustrates how various computing devices can communicate via a network, according to one embodiment. Network 565 (e.g., network 150 of FIG. 1) generally represents any type or form of computer network or architecture capable of facilitating communication between host computing device 105 and other devices 570 (e.g., a centralized cloud cybersecurity platform or security server 145). For example, network 565 can be a Wide Area Network (WAN) (e.g., the Internet) or a Local Area Network (LAN). In certain embodiments, a communication interface, such as communication interface 545 in FIG. 5, may be used to provide connectivity between host computing device 105 and other devices 570, and network 565. The embodiments described and/or illustrated herein are not limited to the Internet or any particular network-based environment, and can include cloud-based computing environments.

In some examples, all or a portion of security server 145 and/or host computing device 105 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, command execution throttling engine 115 may transform the behavior of host computing device 105 to perform selective and granular agent-based throttling of command executions that is OS and command agnostic.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
allocating a resource consumption threshold to an agent process, wherein
the agent process is configured to perform one or more data collection tasks on a host computing device;
generating a desired throttle level for the agent process based on the resource consumption threshold allocated to the agent process; and
controlling execution of the agent process in a plurality of polling intervals, comprising in each polling interval:
determining a current throttle level for the agent process based on a run count and a skip count of the agent process,
suspending the agent process if the agent process is active and the current throttle level is greater than the desired throttle level, and
resuming the agent process if the agent process is idle and the current throttle level is not greater than the desired throttle level.

2. The method of claim 1, wherein
the run count indicates a number of polling intervals that the agent process has been active,
the skip count indicates a number of polling intervals that the agent process has been idle, and
the current throttle level is determined based on a ratio of (a) the run count and (b) a sum of the run count and the skip count.

3. The method of claim 1, wherein
the desired throttle level indicates an efficiency value at which the agent process is to run.

4. The method of claim 1, wherein
the controlling of the execution of the agent process is initiated in response to a determination that a resource consumption of the host computing device has exceeded a threshold.

5. The method of claim 1, wherein
the desired throttle level is determined based on a configuration of the host computing device.

6. The method of claim 1, wherein
the desired throttle level is determined based on one or more types of commands to be executed by the agent process.

7. The method of claim 6, wherein
the one or more types of commands comprise one or more of:
a command search for one or more files in a file system,
a command to read a file on the file system,
a running a task automation command,
a configuration management command,
a command to extract user group policy information,
a command to search plain-text data sets,
a command to calculate a hash function checksum, and
a command to execute a script.

8. The method of claim 1, wherein
the controlling is performed by a command execution throttling engine on the host computing device, and
the command execution throttling engine is configured to control execution of a plurality of agent processes on the host computing device.

9. The method of claim 1, wherein
suspending the agent process comprises suspending one or more children processes of the agent process, and
resuming the agent process comprises resuming the one or more children processes of the agent process.

10. The method of claim 1, wherein
a frequency of the polling intervals is controlled by a polling interval manager on the host computing device, and
the polling interval manager is configured to modify the frequency of the polling intervals based on one or more characteristics agent process or the host computing device.

11. A system comprising:
one or more computing systems that implement a command execution throttling engine, configured to:
allocate a resource consumption threshold to an agent process, wherein the agent process is configured to perform one or more data collection tasks on a host computing device;
generate a desired throttle level for the agent process based on the resource consumption threshold allocated to the agent process; and
control execution of the agent process in a plurality of polling intervals to, in each polling interval:
determine a current throttle level for the agent process based on a run count and a skip count of the agent process,
suspend the agent process if the agent process is active and the current throttle level is greater than the desired throttle level, and
resume the agent process if the agent process is idle and the current throttle level is not greater than the desired throttle level.

12. The system of claim 11, wherein
the run count indicates a number of polling intervals that the agent process has been active,
the skip count indicates a number of polling intervals that the agent process has been idle, and
the current throttle level is determined based on a ratio of (a) the run count and (b) a sum of the run count and the skip count.

13. The system of claim 11, wherein
the controlling of the execution of the agent process is initiated in response to a determination that a resource consumption of the host computing device has exceeded a threshold.

14. The system of claim 11, wherein
the desired throttle level is determined based on a configuration of the host computing device.

15. The system of claim 11, wherein
the desired throttle level is determined based on one or more types of commands to be executed by the agent process.

16. The system of claim 11, wherein
to suspend the agent process, the command execution throttling engine is configured to suspend one or more children processes of the agent process, and
to resume the agent process, the command execution throttling engine is configured to resume the one or more children processes of the agent process.

17. The system of claim 11, wherein
- the command execution throttling engine implements a polling interval manager, and
- the polling interval manager is configured to modify a frequency of the polling intervals based on one or more characteristics agent process or the host computing device.

18. One or more non-transitory computer-readable media storing instructions that when executed on one or more processors implement a command execution throttling engine and cause the command execution throttling engine to:
- allocate a resource consumption threshold to an agent process, wherein the agent process is configured to perform one or more data collection tasks on a host computing device;
- generate a desired throttle level for the agent process based on the resource consumption threshold allocated the agent process; and
- control execution of the agent process in a plurality of polling intervals to, in each polling interval:
  - determine a current throttle level for the agent process based on a run count and a skip count of the agent process,
  - suspend the agent process if the agent process is active and the current throttle level is greater than the desired throttle level, and
  - resume the agent process if the agent process is idle and the current throttle level not greater than the desired throttle level.

19. The one or more non-transitory computer-readable media of claim 18, wherein
- the run count indicates a number of polling intervals that the agent process has been active,
- the skip count indicates a number of polling intervals that the agent process has been idle, and
- the instructions when executed on the one or more processors cause the command execution throttling engine to determine the current throttle level based on a ratio of (a) the run count and (b) a sum of the run count and the skip count.

20. The one or more non-transitory computer-readable media of claim 18, wherein
- the instructions when executed on the one or more processors cause the command execution throttling engine to determine the desired throttle level based on one or more types of commands to be executed by the agent process.

* * * * *